United States Patent
Boll et al.

(10) Patent No.: US 6,752,190 B1
(45) Date of Patent: *Jun. 22, 2004

(54) CURE-ON-THE-FLY SYSTEM

(75) Inventors: David J. Boll, Salt Lake City, UT (US); Kenneth A. Lowe, West Valley City, UT (US); William T. McCarvill, Salt Lake City, UT (US); Michael R. McCloy, Murray, UT (US)

(73) Assignee: Alliant Techsystems Inc., Edina, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 957 days.

(21) Appl. No.: 08/122,344

(22) Filed: Sep. 15, 1993

Related U.S. Application Data

(63) Continuation of application No. 07/739,115, filed on Jul. 31, 1991, now abandoned.

(51) Int. Cl.[7] .............................................. B65H 81/00
(52) U.S. Cl. ...................... 156/433; 156/425; 156/430; 156/173; 156/175; 156/359
(58) Field of Search ................................ 156/169, 172, 156/173, 425, 428, 429, 430, 175, 359, 166, 322, 433

(56) References Cited

U.S. PATENT DOCUMENTS

| | | | | |
|---|---|---|---|---|
| 2,596,162 A | * | 5/1952 | Muskat | .................... 156/222 X |
| 2,683,105 A | * | 7/1954 | Forbes et al. | ................ 156/312 |
| 3,025,205 A | | 3/1962 | Young | |

(List continued on next page.)

FOREIGN PATENT DOCUMENTS

| | | | | |
|---|---|---|---|---|
| DE | 2300816 | 9/1973 | | |
| DE | 3223231 | 6/1982 | ............ | B29D/3/02 |
| DE | 3226290 | 7/1982 | | |
| EP | 0198744 | 3/1986 | | |
| GB | 2213793 | * 8/1989 | ............ | 156/244.24 |
| JP | 61160836 | 7/1986 | | |
| WO | 9007428 | 7/1990 | | |

OTHER PUBLICATIONS

Evans, Don O., et al, "Fiber Placement Process Study," SAMPE 34th Symposium Book of Proceedings., May 8–11, 1989, pp. 1–12.*

Klein, Allen J., "Automated tape laying", *Advanced Composites*, Jan./Feb. 1989, pp. 44–52.*

Grimshaw et al., "Automated Tape Layup of a BMI Vertical Stabilizer Skin", Sep. 15–17, 1987, pp. 173–182.

Cincinnati Milacron, "Into The Future . . . With Better Ways to Automate the the Manufacture of Composite Parts", 1989.

(List continued on next page.)

*Primary Examiner*—Jeff H. Aftergut
(74) *Attorney, Agent, or Firm*—TraskBritt

(57) ABSTRACT

Fiber laminations with a resin therein are advanced to substantial cure in situ while resin-impregnated fiber (in the form of individual tows, a band thereof, or a tape) is being placed on a workpiece on the mandrel by preheating the fiber in a temperature range of 100–700° F. for partially advancing the cure of the resin in the fiber, shaping the fiber to the desired shape, and laying up the partially advanced fiber on the workpiece on the mandrel while simultaneously nip-point heating the fiber in an area proximate to the point where the fiber is being placed on the workpiece. A plurality of parameters are monitored during this placement in order to control the nip-point heating so that the resin in the fiber is substantially cured while the fiber is being placed on the workpiece.

30 Claims, 4 Drawing Sheets

U.S. PATENT DOCUMENTS

| | | | |
|---|---|---|---|
| 3,313,670 A | * 4/1967 | Sherwood | 156/359 |
| 3,574,040 A | 4/1971 | Chitwood et al. | 156/522 |
| 3,616,070 A | * 10/1971 | Lemelson | 156/173 X |
| 3,616,078 A | 10/1971 | Howard | |
| 3,694,927 A | * 10/1972 | Sorenson | 156/322 X |
| 3,723,157 A | 3/1973 | Durin | |
| 3,737,352 A | * 6/1973 | Avis et al. | 156/181 |
| 3,775,219 A | 11/1973 | Karlson et al. | |
| 3,819,461 A | 6/1974 | Saffadi | |
| 3,844,822 A | * 10/1974 | Boss et al. | 118/59 X |
| 3,970,831 A | 7/1976 | Hegyi | |
| 4,145,740 A | * 3/1979 | McClean et al. | 156/175 X |
| 4,168,194 A | * 9/1979 | Stiles | 156/322 X |
| 4,221,619 A | 9/1980 | Lemons | |
| 4,292,108 A | 9/1981 | Weiss et al. | |
| 4,351,688 A | 9/1982 | Weiss | 156/358 |
| 4,382,836 A | 5/1983 | Frank | |
| 4,461,669 A | 7/1984 | Dontschef | |
| 4,508,584 A | 4/1985 | Charles | |
| 4,531,998 A | 7/1985 | Peterson | |
| 4,557,790 A | 12/1985 | Wisbey | 156/511 |
| 4,569,716 A | * 2/1986 | Pugh | 156/523 X |
| 4,591,402 A | * 5/1986 | Evans et al. | 156/523 X |
| 4,610,402 A | 9/1986 | Corbett et al. | |
| 4,699,683 A | 10/1987 | McCowin | |
| 4,790,898 A | 12/1988 | Woods | 156/166 |
| 4,797,172 A | * 1/1989 | Herbert et al. | 156/425 |
| 4,799,981 A | 1/1989 | Stone et al. | |
| 4,822,444 A | 4/1989 | Weingart et al. | |
| 4,867,834 A | 9/1989 | Alenskis et al. | 156/433 |
| 4,872,619 A | 10/1989 | Vaniglia | |
| 4,877,193 A | 10/1989 | Vaniglia | |
| 4,877,471 A | 10/1989 | McCowin et al. | |
| 4,907,754 A | 3/1990 | Vaniglia | |
| 4,943,338 A | 7/1990 | Wisbey | |
| 5,015,326 A | 5/1991 | Frank | |
| 5,022,952 A | 6/1991 | Vaniglia | |
| 5,045,147 A | * 9/1991 | Benson et al. | 156/425 X |
| 5,078,592 A | * 1/1992 | Grimshaw et al. | 156/359 X |
| 5,104,474 A | * 4/1992 | Scola et al. | 156/322 X |
| 5,698,066 A | * 12/1997 | Johnson et al. | 156/433 X |

OTHER PUBLICATIONS

D. V. Rosato et al., "Filament Winding: its development, manufacture, applications, and design", pp. 103–109 (Interscience Publishers 1964).

M. E. Rosheim, "A New Pitch–Yaw–Roll Mechanical Robot Wrist Activator", Jun., 1985, Society of Manufacturing Engineers, vol. 2.

R. Merritt, "Industrial Robots" Getting Smarter All the Time, Instruments & Control Systems, p. 32 (Jul. 1982).

Milacron Today, "Fiber Placement: Automating Complex Composite Parts Processing", vol. 4, No. 6 (Jun 1989).

The Ingersoll brochure entitled "Automated Machinery for Composite Manufacturing", 1989.

Evans et al., "Fiber Placement Process Study", Tomorrow's Materials: Today, SAMPE, vol. 34–II, pp. 1822–1833, May 8–11, 1989.

W. B. Goldsworthy, *N/C Tape Laying—Tomorrow's Future Today*, Western Metal & Tools Conf. Soc. of Manf. Engineers, Mar. 11–15, 1974.

W. O. Sunafrank et al., "*Development of Composite Tape Laying Process for Advanced Fibrous Reinforced Composite Structures*", Mar. 1971.

Cincinnati Milacron/General Dynamics, *Tape Laying*.

Hercules Incorporated, *Fiber Placement, the Key Technology for Affordable High Performance Structures*, Jan. 1990.

\* cited by examiner

CURE-ON-THE-FLY SYSTEM

This application is a continuation of application Ser. No. 07/739,115, filed Jul. 31, 1991 now abandoned.

BACKGROUND

1. Field of the Invention

The present invention relates to composite structures manufacturing methods and apparatus for practicing such methods and, more particularly, to manufacturing composite structures using preimpregnated fibrous materials in fiber placement and/or tape laying systems.

2. State of the Art

Prior to the present invention, fiber placement systems generally consisted of placing rovings or tows impregnated with either thermoplastic or thermosetting-type resin as a single tow or an entire band of tows in a number of superimposed layers onto a workpiece on a mandrel to produce a geodesic-shaped article. This geodesic-shaped article was then placed in a bag, a vacuum was then created in the bag, and the bag was placed in an autoclave and heated at high temperatures and pressures in order to cure and consolidate the article.

Another technique used in the art to cure and consolidate composite structures uses only an oven rather than an autoclave. Autoclave curing requires constant monitoring and additional safety precautions as well as being more expensive in operation, while oven curing does not require constant monitoring or additional safety precautions and is cheaply operated. This technique places fiber tows using a wet filament winding technique where the composite material would gel at room temperature and then the component part is cured in an oven.

This previous technique produced parts that had high void levels (i.e., up to 10%) when oven cured, or required additional handling to produce low void levels parts (i.e., less than 2%). In the wet winding technique, an excess of resin had to be used, followed by a squeegee technique, or vacuum consolidation and gas removal during the oven cure to produce a low void part.

Both of the prior art fiber placement and wet winding processes have disadvantages. Wet-winding, while offering the advantage of simple oven curing, is not conducive to fiber placement. The versatility of fiber placement is its capability of winding complex shapes using more of a variety of winding angles, changing angles while winding, and cutting and adding tows on demand. Fiber placement, on the other hand, needs high-performance prepreg systems, and requires consolidation using a vacuum bag and autoclave pressure during curing. Also, in the fabrication of very thick structures where many layers of fiber are superimposed on each other, waves in the superimposed layers are normally formed because of debulking (i.e., elimination of voids) during curing of the structure in an autoclave.

The present invention overcomes the disadvantages of the prior art by substantially curing the fiber as it is being laid down on the workpiece on the mandrel in a system to be marketed under the trademark "Cure-on-the-Fly".

SUMMARY OF THE INVENTION

The present invention is directed to a method of producing substantially cured fiber laminations in situ while laying up fiber on a mandrel comprising:

a) impregnating at least one fiber tow or tape with at least one thermoset resin, b) passing the at least one impregnated tow or tape to a preheating zone for preheating the tow or tape to a predetermined temperature based on the particular thermoset resin in the range of from ambient to about 375° C. where the curing of the tow or tape is partially advanced, and c) laying up the partially advanced, preheated tow or tape onto the mandrel while simultaneously advancing the curing of said tow to substantial completion (i.e., greater than 60%) by
  i) supplying additional heat simultaneously to the area of the mandrel proximate to where the fiber is being placed thereon,
  ii) monitoring a plurality of parameters characteristic of said fiber placement apparatus, and
  iii) controlling the amount of advancement of cure of the resin in the fiber as a function of the monitored values of said predetermined parameters.

This invention also comprehends a fiber placement system for performing the above-mentioned method comprising:

a) means for impregnating at least one fiber tow or tape with a thermoset resin, b) means for preheating the at least one impregnated tow or tape to a predetermined temperature within an advancement to cure range for a predetermined time period based on characteristics of the resin for partially advancing the resin to cure, c) means for laying up the preheated, partially advanced to cure tow or tape onto a mandrel, and d) nip-point heating means associated with at least one parameter monitoring means located proximate to the laying up means for simultaneously heating the tow or tape to a temperature within the curing range of the resin while the tows are being placed on the mandrel and the curing of said tow or tape are being further advanced to substantially completion.

DETAILED DESCRIPTION OF THE INVENTION

Figure 1:
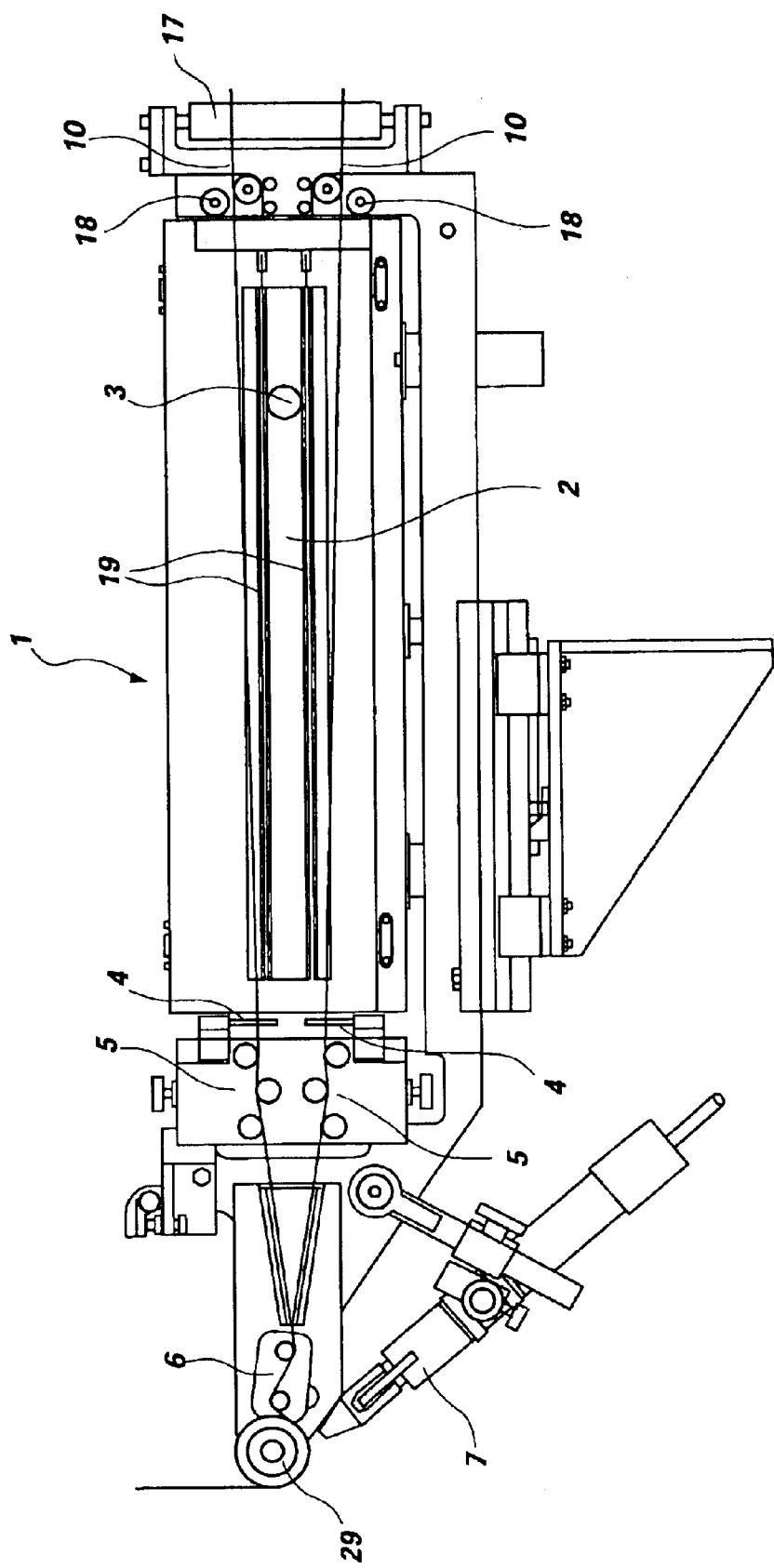
FIG. 1 is a side view of one embodiment of the delivery head that has two ribbonizing sections therein for practicing the inventive fiber lamination method.

This invention uses chemical advancement of thermoset resin systems to achieve a substantial degree of cure during the process of fabricating composite structures. One approach is to advance the prepreg tow material as close to cure as practicable in an off-line process (i.e., a system where the tows or tape is impregnated and advanced to cure independent of the laying up system). A practical limitation to the degree of advancement of the matrix system is that the matrix cannot be at greater than 60% cross-link density when the tows or tape (sometimes referred to as "band") is placed on the workpiece on the mandrel as the first layer or as superimposed layers over the first layer: once a layer has another layer superimposed on top of it, the under layer is referred to as "underlayment." The matrix system should also be pliable and conformable to the underlayment. This degree of advancement of the matrix system, in part, depends on the resin content and the physical and chemical characteristics of the resin system. A resin system that achieves a high percentage of chemical conversion at gel (i.e., the term gel denotes the degree of advancement at which the resin transitions from a liquid to a rubbery or solid state) is more suitable for off-line advancement, while the inherent stiffness of the polymer exercises a limitation on the degree of cross-linking that can be tolerated without compromising manufacturability. When an off-line process is used where the resin in the tows or tape is advanced to near gel by low temperature (such as 100° to 120° F.) oven staging, this process requires a resin system that can be advanced to a quasi thermoplastic state of advancement to cure (or gel) without the layers of tow on a spool sticking together or becoming too stiff for unspooling. Longer gel times can be tolerated because of the nature of this off-line process. Substantial further advancement to cure is accomplished by directing a high-temperature heat source such as an air torch, on the prepreg tow during winding as it is processed through a nip-point compaction head. This process may optionally be followed by a postcure in an oven or other energy sources.

A second approach is to apply on-line cure staging by passing the prepreg tow through a heated delivery tube, which will bring the matrix system to between 40 and 60% cross-link density during the fabrication of a composite part. The underlayments can be, and usually are greater than 60% cross-linked. The resin characteristics desired for this approach are: latency of gellation (or curing) at subambient temperature and short gel times at elevated temperatures and flexibility and spreadability at process temperatures; the resin matrix also must be able to form a cohesive bond between the underpayment and overlayment.

The resin matrices used in the invention for impregnating fibrous tows, unidirectional (in a single direction on the workpiece) and/or cross-ply (criss-cross direction) tapes are thermoset resins. Nonlimiting examples of thermoset resins that can be used in this invention are epoxy, phenols, cyanate esters, bismaleimide-type resins, and mixtures thereof. The temperature at which the resin cures depends upon the type of resin being used.

The in situ consolidation and void removal steps used in practicing the instant invention will depend on the prepreg system being used. The initial advancement of the prepreg tow is achieved by passing it through a high-temperature (e.g., 300° to 500° F.) heating zone on the fiber placement machine, in an on-line (or in situ) process. Short gel times are required for the resin system because of the speed at which the resin must gel. The conformability required for part fabrication is achieved by maintaining the prepreg tow at high temperatures with nip-point heating as it is advanced, thereby, facilitating delivery of the prepreg tow. The advanced material is passed through a nip-point compacting delivery head, at which point additional heat (e.g., at a temperature 300 to 800° F.) is applied and the material becomes substantially cured (that is greater than 60% cured). The resulting part can be fully cured using several different energy sources without the use of additional consolidation steps, i.e., vacuum bags or autoclaves.

Generally, the underlayers, when they are laid down, have a cross-link density of equal to or greater than 40%, preferably greater than 60%, while it is desirable that the overlayers to be laid down should have a cross-link density in the range of 40–60%. This is desirable so that the interfacing surfaces of adjacent layers will cross-link together forming a homogeneous (continuous), workpiece without forming seams. In other words, it is desirable that the individual layers cannot be recognized in a cross-sectional view of the workpiece but rather that it appears to be uniform. After the fibrous material has been laid down to become underlayers, these underlayers will continue to be cross-linked from the heat of the nip-point heating of the overlayer being laid down until the underlayer is completely insulated from the heat of the overlayer. This insulation will occur after a certain number of layers are laid down on top of it depending upon the thickness of the layers being overlaid (i.e., it may occur after as little as two superimposed layers or it might take many layers such as from 3 to 10 or higher). Hence, the underlayers can be cross-linked to a greater than 75% cross-link density, preferably greater than 95% cross-link density, because of the continuous heat effect of the nip-point heating of the overlayments.

In an example of how models are developed for the temperature/time profiles for programming the on-line operation unit of the fiber placement system for achieving the desired percentage of cross-link density for the underlayers and overlayers, the following experimental procedure was conducted on three different epoxy-type resins for such determinations. The resin systems used in these experiments are resins of Hercules Incorporated and are as follows:

1) resin A—is a hotmelt, 250° F. curable epoxy resin system developed to operate at temperatures up to about 180° F.

2) resin B—is an amine-cured epoxy resin system for general purpose structural applications in temperature environments up to 275° F.

3) resin C—is an amine-cured, toughened epoxy resin system developed as a low-flow system to operate in temperature environments of 250° F. The impact and damage tolerance properties of resin C are superior to those of other structural epoxy resin systems.

Instantaneous gel tests were run on a Fisher Johns hot stage, where the temperature was controlled to ±1° F. A small amount of resin was placed on the temperature stabilized hot stage and the timer was started. When the resin reached a state where it no longer flowed together, i.e., gelled, the timer was stopped. After the gel had been determined at several temperatures, a graph was developed on semilog graph paper. The time and temperatures measurements for the graphs were as follows:

| TIME (sec.) | TEMPERATURE (° F.) |
|---|---|
| 1) For resin A: | |
| 424 | 250 |
| 196 | 275 |
| 55 | 317 |
| 50 | 326 |
| 20 | 373 |
| 20 | 369 |
| 13 | 417 (started to show degradation) |

| TIME (sec.) | TEMPERATURE (° F.) |
|---|---|
| 2) For resin B: | |
| 300 | 350 |
| 35 | 417 |
| 30 | 424 |

-continued

| | |
|---|---|
| 15 | 450 |
| 12 | 451 |
| 5 | 490 |
| 4 | 496 |
| 3 | 502 (started to show degradation) |
| TIME (min.) | TEMPERATURE (° F.) |
| 3) For resin C: | |
| 80 | 225 |
| 55 | 250 |
| 27 | 300 |
| 12 | 350 |
| 7.5 | 375 |
| 3.3 | 425 |
| 1.4 | 475 |
| 1.2 | 500 |

Based on the above-mentioned measurements, the truest line was drawn on semilog graph paper and the line was extrapolated from 325° to 550° F; this line represented a 100% gel of the resin system. From this experimental line, the percentage of cross-link was estimated in order to obtain the preferred range of 40 to 60% cross-link density lines for each resin. These estimations were plotted on semilog paper using the same slope as the experimental data provided. These plots were used as the "process window." In order to use this process window for setting up the parameters of the fiber placement system, the total transient time in the heating section of the particular fiber placement head had to be considered. Using this transient time, the average heating temperature was derived for use in the process in order to obtain a given level of conversion.

For completion of a closed-loop control, the temperature at the outlet of the air gun used for supplying the nip-point heating was also monitored. The mandrel rotation of the fiber placement system was controlled at a predeterminate speed. The means for monitoring a plurality of parameters includes means for monitoring the speed of the mandrel. A monitor and keyboard are linked to the operating computer of the fiber placement system for enabling operator input and control of the system.

Figure 2:
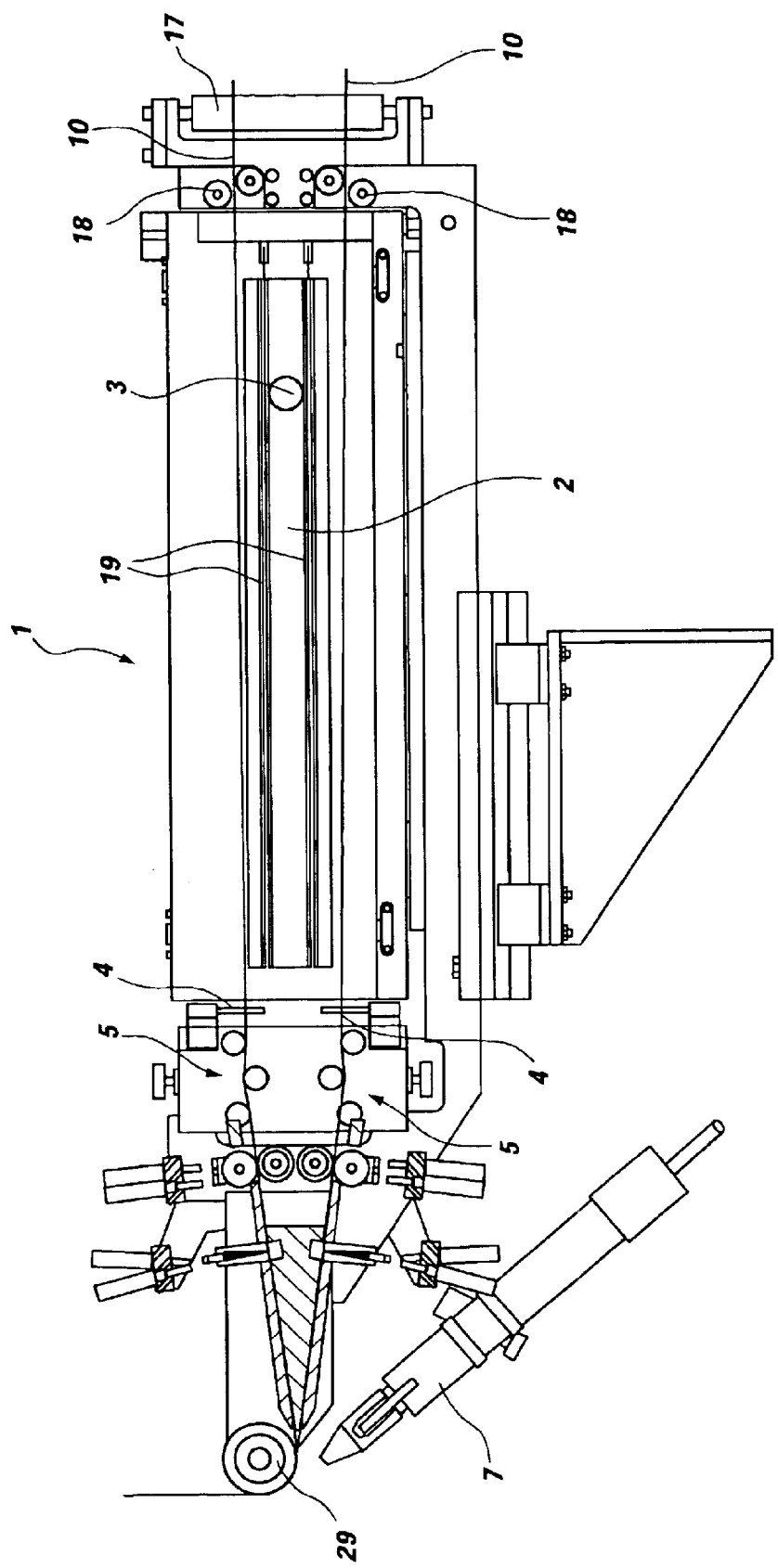
FIG. 2 is a side view of another embodiment of the delivery head that has only one ribbonizing section therein for practicing the inventive fiber lamination method.
Figure 3:
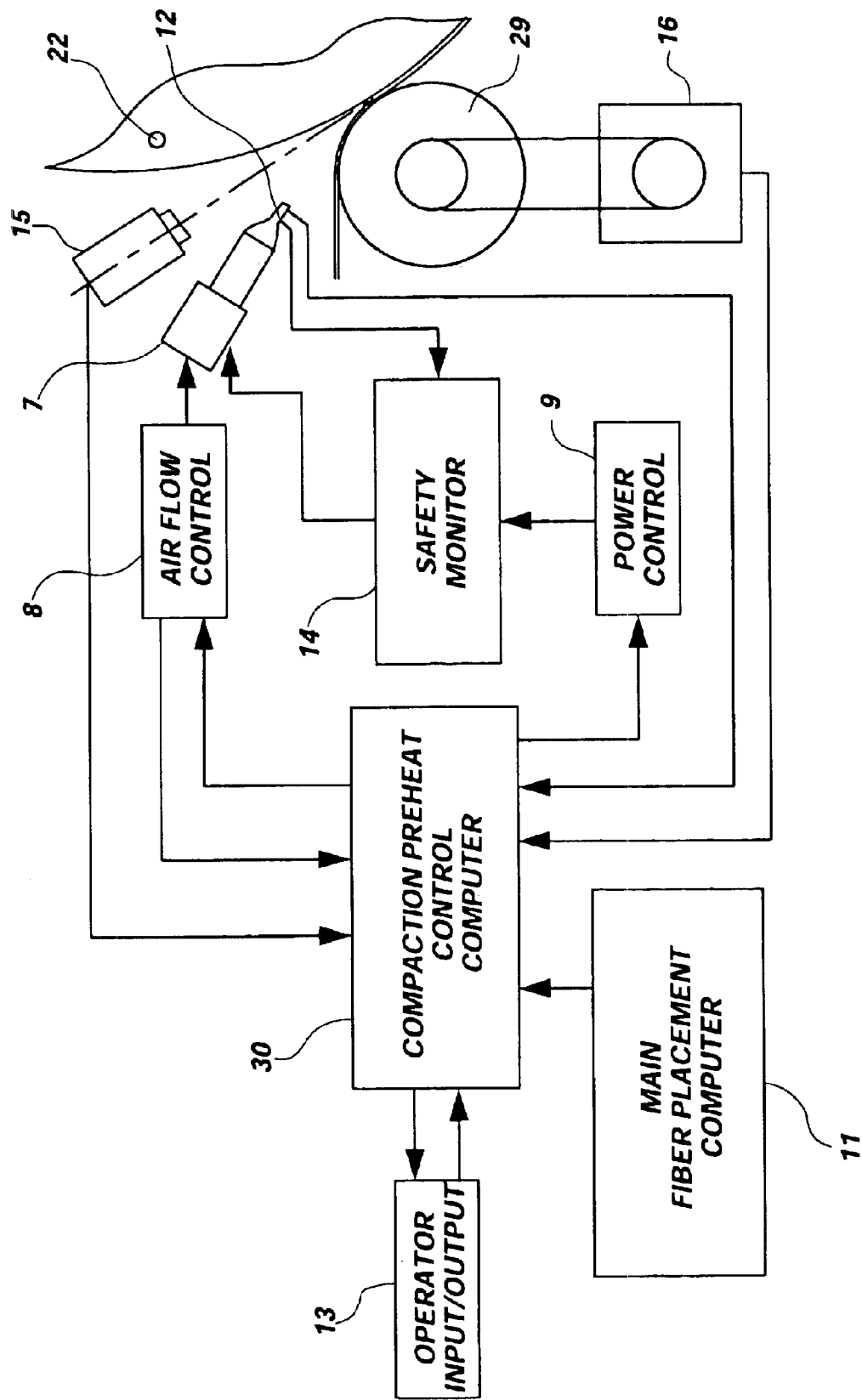
FIG. 3 is a schematic view showing the components of the nip-point heating means of the invention.

For a more detailed description of the invention, FIGS. 1 and 2 illustrate preferred embodiments of the invention. Creel fed partially advanced or nonadvanced prepreg tows 10 that are composed of a high-temperature-resistant, high-performance thermoset resin (such as an epoxy resin) having continuous fibers are continually fed into apparatus 1 where a plurality of prepreg tows 10 (i.e., up to five tows in each of upper and lower paths) enter into the preheating zone 2 through vertically and horizontally situated guide rollers 17 and 18 where half of the tows enter in upper and lower parallel paths. This preheating zone has heating means 3 that heats the tows or tape to a temperature range of 300 to 500° F. for partially advancing to cure the fiber. Perforated plates 19 separate the upper and lower paths and evenly distributes the heating gases from heating means 3. Tows 10 are then passed through distribution means which is in the form of comb 4. The tows are then guided through first ribbonizing section 5. In the upper and lower ribbonizing sections 5 the tows are shaped into the desired shape, such as flattened individual tows or as a consolidated band. The individual tows or tape is then guided onto a wedge-shaped platform where the tows or tape meet in a single plane immediately before passing into a second ribbonizing compaction section 6 (FIG. 1 only) where the tows or tape are formed into single band. Although FIGS. 1 and 2 show embodiments that have ribbonizing sections therein, a ribbonizing section is only optional and not required in other embodiments (not shown). This is especially true where tape is preformed before entering the fiber placement system of this invention for laying down. It should also be noted that the ribbonizing section can be an independent device attached to the system for use therewith. This band then passes to roller 29 and is pressed onto mandrel 22 (FIG. 3). At the point where the tows or tape is placed onto the workpiece on the mandrel 22, heating means 7 simultaneously heats the tows or tape to a higher temperature above 500° F. as it is being placed on the mandrel to substantially completely cure the resin therein (that is, to cure the resin to greater than 60%).

As depicted schematically in FIG. 3, air flow through the heater 7 is controlled by the air flow control device 8. The temperature is maintained by varying the amount of power with the power control and regulating system 9. The resin-impregnated fiber is to be heated to a temperature no greater than the melt temperature of the matrix resin. This nip-point heating is extremely fast (that is, 1 to 2 seconds).

Closed-loop control is achieved by monitoring the temperature of the composite on the mandrel 22 with infrared temperature sensor 15. The temperature, along with fiber speed, as determined by tachometer 16, is processed by compaction preheat control computer 30. In addition to the above-mentioned parameters of fiber temperature and speed, the computer determines the amount of air flow and air temperature which is required by assessing requirements of the process as input from the main fiber placement machine control computer 11.

Additional control is achieved by modeling the effect of heat on the composite resin. Excessive heat can cause areas of localized degradation in extreme cases, and an exothermic reaction can result. Conversely, insufficient heat to the fiber would not supply the required advancement to cure tackiness or compliance required to make a good article. During fiber placement on irregularly shaped mandrels, it is known to vary the speed of fiber placement, depending upon the particular application location of fiber placement on the mandrel. For example, the speed of fiber placement can be decreased as somewhat intricate turns or edges are traversed by the fiber delivery head. As the temperature of the composite is a function of the difference in temperature between the air source and fiber being heated, as well as the length of time the temperature is applied, modeling is necessary to keep fiber temperature within required limits as the speed of the fiber varies.

The amount of heat applied in the nip-point heating can be controlled by controlling the preheating zone 2 of the invention via a computer model, as a function of the shape of the mandrel, e.g., and as a function of the composition of the fiber tow being laid. The temperature of the heated air and the quantity of air per unit of time produced at the heater 7, which may include an air gun, can be selectively increased or decreased and/or the duration of the heated air, e.g., can be selectively controlled throughout the laying of fiber upon the mandrel during the formation of the article.

Redundant regulation of the system is accomplished by monitoring the temperature of the air leaving the heater 7 with a thermocouple 12. Should the temperature rise too high for too long as predetermined by operator experience, the process will be interrupted by a separate safety monitoring system 14. Operator input and control are accomplished through a monitor and keyboard 13.

Figure 4:
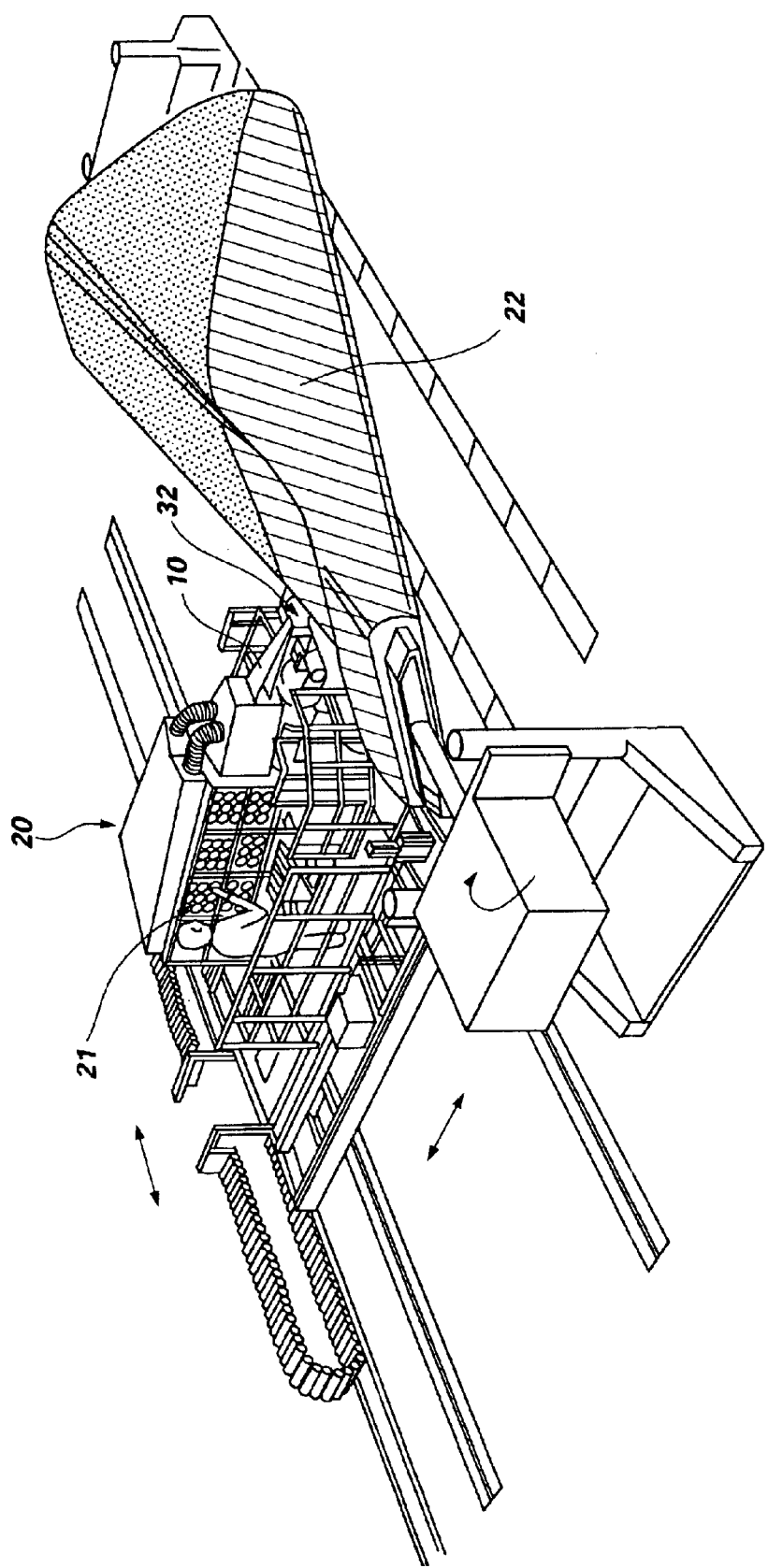
FIG. 4 is a perspective view of a complete fiber placement system using the Cure-On-The-Fly™ system.

FIG. 4 illustrates, in perspective, a filament placement system 20 in which the Cure-on-the-Fly™ system of the present invention can be used. Individual rovings or tows 10 are passed from the creel 21 to the delivery head 32, which is mounted onto a manipulator, and emerge at the delivery or compaction roller 29. The compaction roller 29 applies the tows 10, formed into a band, onto the rotating mandrel 22. The air heater 7 is shown in FIG. 2 as being attached to the delivery head 32 but, if desired, can be a free-standing, movable device or can be attached to another part of the fiber placement system where practicality dictates for the most efficient operation. Operation of the fiber placement system 20, including the delivery head 32, is controlled by computer 11.

The articles manufactured by the process of the instant invention are a high fiber volume, low void content, composite part which can be fully cured (i.e., to a 100%) using several different energy sources without the aid of additional compaction steps such as vacuum bags or autoclaves. This process will allow large structures to be fabricated more efficiently without the use of ovens or autoclaves. Extremely thick structures can be fabricated without wave formation, due to debulking during curing. Possible exotherms can be reduced because of the lower energy potential of the matrix system going into the final cure. Given the appropriate resin system, this process will allow for total cure of the composite at the time of fiber placement.

Although the invention has been described with reference to particular means, materials, and embodiments, it is to be understood that the invention is not limited to the particulars disclosed and extends to all equivalents within the scope of the claims.

What is claimed is:

1. A method of producing substantially cured fiber reinforced lamination in situ while laying up at least one thermoset resin-impregnated fiber tow or tape on a mandrel, comprising:

passing the at least one thermoset resin-impregnated fiber tow or tape through a preheating zone of a fiber placement apparatus to preheat the thermoset-resin impregnated fiber tow or tape to a predetermined temperature based on the particular thermoset resin so as to partially advance curing of the thermoset resin; and laying up on the mandrel the at least one fiber tow or tape impregnated with the thermoset resin in a preheated state and exhibiting a partially advanced cure while simultaneously advancing the curing of the thermoset resin to substantial completion of greater than 60% cross-link density by:

supplying heat to an area of the mandrel proximate a location of application thereto of the at least one thermoset resin-impregnated fiber tow or tape;

monitoring a plurality of parameters associated with application of the at least one thermoset resin-impregnated fiber tow or tape by the fiber placement apparatus to the mandrel; and controlling a degree of advancement of cure of the thermoset resin in the at least one thermoset resin-impregnated fiber tow or tape as a function of values of at least one of the monitored parameters.

2. The method of claim 1, wherein the at least one thermoset resin-impregnated tow or tape comprises a plurality of tows passed while in a preheated state and exhibiting a partially advanced cure to a ribbonizing zone of the fiber placement apparatus for shaping into a desired shape prior to being laid up on the mandrel.

3. The method of claim 1, wherein monitoring a plurality of parameters comprises monitoring a temperature of the area of the mandrel proximate the location of application of the at least one thermoset resin-impregnated fiber tow or tape thereto, and controlling the degree of advancement of cure of the thermoset resin is effected at least in part by varying the heat supplied to the area of the mandrel proximate the location of application of the at least one thermoset resin-impregnated fiber tow or tape thereto as a function of values of the monitored mandrel temperature.

4. The method of claim 3, further comprising supplying heat to the area of the mandrel proximate the location of application of the at least one thermoset resin-impregnated fiber tow or tape thereto with an air gun.

5. The method of claim 3, wherein controlling the degree of advancement of cure of the thermoset resin further comprises terminating heat supplied to the mandrel if heat supplied thereto exceeds a predetermined temperature.

6. The method of claim 3, wherein monitoring a temperature is effected with an infra red temperature sensor.

7. The method of claim 6, further comprising supplying heat to the area of the mandrel proximate the location of application of the at least one thermoset resin-impregnated fiber tow or tape thereto with an air gun.

8. The method of claim 6, wherein controlling the degree of advancement of cure of the thermoset resin further comprises terminating heat supplied to the mandrel if heat supplied thereto exceeds a predetermined temperature.

9. The method of claim 1, wherein heat is supplied to the area of the mandrel with an air gun having an outlet aimed at the location of application of the thermoset resin-impregnated fiber tow or tape to the mandrel and monitoring the plurality of parameters comprises monitoring a temperature at the outlet of the air gun.

10. The method of claim 9, further including varying an amount of heat supplied to the area of the mandrel proximate the location of application of the at least one thermoset resin-impregnated fiber tow or tape thereto responsive to the temperature monitored at the outlet of the air gun.

11. The method of claim 10, further including terminating heat supplied to the area of the mandrel proximate the location of application of the at least one thermoset resin-impregnated fiber tow or tape thereto if a temperature of the heat supplied exceeds a predetermined value.

12. The method of claim 1, wherein the mandrel is adapted to rotate, monitoring a plurality of parameters comprises monitoring a rotational speed of the mandrel and monitoring a temperature of the area of the mandrel proximate the location of application of the at least one thermoset resin-impregnated fiber tow or tape thereto, and controlling the degree of advancement of cure of the thermoset resin is effected at least in part by varying the heat supplied to the area of the mandrel proximate the location of application of the at least one thermoset resin-impregnated fiber tow or tape thereto as a function of values of the monitored rotational speed of the mandrel in combination with values of the monitored mandrel temperature.

13. The method of claim 1, wherein controlling a degree of advancement of cure of the thermoset resin in the at least one thermoset resin-impregnated fiber tow or tape as a function of values of at least one of the monitored parameters comprises varying heat supplied to the area of the mandrel proximate the location of application of the at least one thermoset resin-impregnated fiber tow or tape to the mandrel as a function of a computer model responsive to values of temperature monitored on the mandrel proximate the location of application of the at least one thermoset resin-impregnated fiber tow or tape thereto.

14. The method of claim 1, wherein heat is supplied to the area of the mandrel proximate the location of application of the at least one thermoset resin-impregnated fiber tow or tape thereto by an air gun and controlling a degree of advancement of cure of the thermoset resin in the at least one thermoset resin-impregnated fiber tow or tape as a function of values of the monitored parameters includes varying at least one of air flow rate and air temperature supplied by the air gun responsive to values of temperature monitored on the area of the mandrel proximate the location of application of the at least one thermoset resin-impregnated fiber tow or tape thereto.

15. The method of claim 14, wherein the thermoset resin has a predetermined melt temperature, and controlling the advancement of cure of the thermoset resin comprises maintaining temperature monitored on the area of the mandrel proximate the location of application of the at least one thermoset resin-impregnated fiber tow or tape thereto below the melt temperature of the thermoset resin.

16. The method of claim 1, wherein controlling the degree of advancement of cure of the thermoset resin is effected as a function of composition of the thermoset resin-impregnated fiber tow or tape.

17. The method of claim 16, wherein the thermoset resin has a predetermined melt temperature, and controlling the advancement of cure of the thermoset resin comprises maintaining a temperature of the area of the mandrel proximate the location of application of the at least one thermoset resin-impregnated fiber tow or tape thereto below the melt temperature of the thermoset resin.

18. The method of claim 1, wherein laying up comprises passing the at least one partially advanced thermoset resin-impregnated fiber tow or tape to a delivery or compaction roller and applying the at least one partially advanced thermoset resin-impregnated fiber tow or tape to the mandrel with the delivery or compaction roller.

19. The method of claim 18, wherein the at least one thermoset resin-impregnated fiber tow or tape comprises a plurality of tows passing from creels to a delivery head, which is mounted on a manipulator, and the delivery or compaction roller applies the plurality of tows, formed into a band, onto the mandrel.

20. The method of claim 1 further comprising impregnating at least one fiber tow or tape with at least one thermoset resin.

21. The method of claim 1, wherein the at least one thermoset resin-impregnated fiber tow or tape is preheated to a temperature in a range from ambient to about 375° C.

22. The method of claim 1, further comprising maintaining the preheating zone at a temperature from about 300° F. to 500° F.

23. The method of claim 1, further comprising heating the at least one thermoset resin-impregnated tow or tape to a temperature above about 500° F. as it is applied to the mandrel.

24. The method of claim 1, further comprising supplying heat at a temperature from about 300° F. to about 800° F. to the area of the mandrel proximate the location of application of the at least one thermoset resin-impregnated fiber tow or tape thereto.

25. The method of claim 1, further comprising varying heat supplied to the at least one thermoset resin-impregnated fiber tow or tape responsive to a monitored speed of placement thereof on the mandrel to achieve the advancement of cure of the thermoset resin to substantial completion without degradation of the lamination.

26. The method of claim 1, further comprising varying heat supplied to the at least one thermoset resin-impregnated fiber tow or tape responsive to a monitored temperature proximate the location of placement of the at least one thermoset resin-impregnated fiber tow or tape on the mandrel to achieve the advancement of cure of the thermoset resin to substantial completion without degradation of the lamination.

27. The method of claim 1, further comprising advancing the curing of the thermoset resin to completion without consolidation subsequent the laying up on the mandrel the at least one fiber tow or tape.

28. The method of claim 1, wherein the at least one fiber tow or tape includes a first fiber tow or tape layed up on the mandrel as an underlayment and at least one additional fiber tow or tape as an overlayment being layered on top of the first fiber tow or tape and wherein the method further comprises further advancing the curing of the underlayment to substantial completion of greater than 75% cross-link density through heating of the overlayment.

29. The method of claim 1, wherein the at least one fiber tow or tape includes a first fiber tow or tape layed up on the mandrel as an underlayment and at least one additional fiber tow or tape as an overlayment being layered on top of the first fiber tow or tape and wherein the method further comprises further advancing the curing of the underlayment to substantial completion of greater than 95% cross-link density through heating of the overlayment.

30. A method of producing a cured fiber reinforced lamination in situ while laying up at least one thermoset resin-impregnated fiber tow or tape on a mandrel, comprising:

passing the at least one thermoset resin-impregnated fiber tow or tape through a preheating zone of a fiber placement apparatus to preheat the thermoset resin-impregnated fiber tow or tape to a predetermined temperature based on the particular thermoset resin so as to partially advance curing of the thermoset resin; and laying up on the mandrel the at least one fiber tow or tape impregnated with the thermoset resin in a preheated state and exhibiting a partially advanced cure while simultaneously advancing the curing of the thermoset resin to completion by:

supplying heat to an area of the mandrel proximate a location of application thereto of the at least one thermoset resin-impregnated fiber tow or tape;

monitoring a plurality of parameters associated with application of the at least one thermoset resin-impregnated fiber tow or tape by the fiber placement apparatus to the mandrel; and controlling a degree of advancement of cure of the thermoset resin in the at least one thermoset resin-impregnated fiber tow or tape as a function of values of at least one of the monitored parameters.

* * * * *